(12) United States Patent
Hatta et al.

(10) Patent No.: US 11,035,763 B2
(45) Date of Patent: Jun. 15, 2021

(54) KIT FOR PRODUCING CLEARED BIOLOGICAL SPECIMENS AND METHOD FOR PRODUCING CLEARED BIOLOGICAL SPECIMENS

(71) Applicant: Kanazawa Medical University, Ishikawa (JP)

(72) Inventors: Toshihisa Hatta, Kahoku-gun (JP); Maimi Uchishiba, Kahoku-gun (JP); Nobuaki Higashi, Kahoku-gun (JP); Hiroki Shimada, Kahoku-gun (JP); Eriko Shimamura, Kahoku-gun (JP)

(73) Assignee: KANAZAWA MEDICAL UNIVERSITY, Ishikawa (JP)

( * ) Notice: Subject to any disclaimer, the term of this patent is extended or adjusted under 35 U.S.C. 154(b) by 0 days.

(21) Appl. No.: 14/439,447

(22) PCT Filed: Oct. 30, 2013

(86) PCT No.: PCT/JP2013/079388
§ 371 (c)(1),
(2) Date: Apr. 29, 2015

(87) PCT Pub. No.: WO2014/069519
PCT Pub. Date: May 8, 2014

(65) Prior Publication Data
US 2015/0285718 A1 Oct. 8, 2015

(30) Foreign Application Priority Data

Oct. 30, 2012 (JP) .............................. JP2012-239465

(51) Int. Cl.
*G01N 1/30* (2006.01)
*A01N 1/02* (2006.01)

(52) U.S. Cl.
CPC .............. *G01N 1/30* (2013.01); *A01N 1/0231* (2013.01); *G01N 2001/305* (2013.01)

(58) Field of Classification Search
CPC ............... G01N 1/30; G01N 2011/305; G01N 2001/305
See application file for complete search history.

(56) References Cited

U.S. PATENT DOCUMENTS

| | | | |
|---|---|---|---|
| 4,801,549 A | 1/1989 | Cremins et al. | |
| 4,981,610 A | 1/1991 | Linden et al. | |
| 5,578,452 A * | 11/1996 | Shi | G01N 1/30 |
| | | | 435/40.52 |
| 5,672,696 A * | 9/1997 | Wang | C12Q 1/6806 |
| | | | 536/25.4 |
| 6,207,408 B1 | 3/2001 | Essenfeld et al. | |
| 7,727,718 B2 * | 6/2010 | Chomczynski | C12Q 1/6806 |
| | | | 435/173.7 |

FOREIGN PATENT DOCUMENTS

| | | |
|---|---|---|
| AU | 2002222554 A1 | 6/2003 |
| CN | 101246158 A | 8/2008 |
| EP | 0214613 A2 | 3/1987 |
| EP | 1505871 B1 | 4/2013 |
| JP | H01140064 A | 6/1989 |
| JP | H01290602 A | 11/1989 |
| JP | H03167472 A | 7/1991 |
| JP | H0680501 A | 3/1994 |
| JP | H0680502 A | 3/1994 |
| JP | 2004115482 A | 4/2004 |
| JP | 3723204 B1 | 9/2005 |
| JP | 2005532824 A | 11/2005 |
| JP | 2008239487 A | 10/2008 |
| WO | 03045141 A1 | 6/2003 |
| WO | 2004033622 A2 | 4/2004 |
| WO | 2011020612 A1 | 2/2011 |
| WO | 2011111876 A1 | 9/2011 |

OTHER PUBLICATIONS https://www.researchgate.net/post/Cell_lysis-What_solution_to_use (last visited on May 4, 2016)(comment by Louise Elizabeth Bird on Dec. 17, 2012).*
CN 101246158 (2011).*
Kalantari et al. Cellular and Molecular Mechanisms of Abnormal Calcification Following Ischemia-Reperfusion Injury in Human Liver Transplantation; Modern PAthology, vol. 20, pp. 357-366. (Year: 2007).*
Slater et al. Cranial Osteogenesis and Suture Morphology in Xenopus Laevis: A Unique Model System for Studying Carniofacial Development; PLOS One, vol. 4, No. 1, pp. 1-12. (Year: 2009).*
Dingerkus et al., "Enzyme Clearing of Alcian Blue Stained Whole Small Vertebrates for Demonstration of Cartilage," Stain Technology, vol. 52, No. 4, pp. 229-232 (1977).

(Continued)

*Primary Examiner* — Susan M Hanley
*Assistant Examiner* — Paul C Martin
(74) *Attorney, Agent, or Firm* — Panitch Schwarze Belisario & Nadel LLP

(57) ABSTRACT

A method and a kit are provided to produce a biological clear specimen within a short time and with a wide variety of biological specimens. The method includes the following steps: (1) treating a material to be cleared with an aqueous fixing solution containing paraformaldehyde or the like, a nonionic surfactant, an alkali, and optionally a buffering agent; (2) treating the material from step (1) or a conventionally fixed material with an aqueous clearing accelerator solution containing a nonionic surfactant and an alkali; and (3) treating the material produced in step (1) or (2) with an aqueous preservation solution containing a nonionic surfactant and a polyhydric alcohol. In each of the steps, the nonionic surfactant is present at a concentration of 1% or more. The kit includes solutions used in each of the steps of the method.

17 Claims, 12 Drawing Sheets

(56) References Cited

OTHER PUBLICATIONS

Yokomizo et al., "Whole-mount three-dimensional imaging of internally localized immunostained cells within mouse embryos," vol. 7, No. 3, pp. 421-431 (2002).
Hama et al., "Sca/e: a chemical approach for fluorescence imaging and reconstruction of transparent mouse brain," Nature Neuroscience, vol. 14, No. 11, pp. 1481-1488 (2011).
Kagaku, "Sensei Hikken !! Kantan DIY de Atto Odoroku Misete Oshieru Kagaku Jikken 9 Haisuiko Senjozai to Shenshoku Shiyaku o Tsukate Tomei Kokkaku Hyohon ni Chosen II—Tegaru ni Dekite Impact Manten," Chemistry, vol. 68, No. 9, pp. 46-49 (2013).
International Search Report and Written Opinion dated Dec. 3, 2013 in International Application No. PCT/JP2013/079388.
International Preliminary Report on Patentability dated Jun. 10, 2014 in International Application No. PCT/JP2013/079388.
Extended Search Report dated Jul. 28, 2016 in EP Application No. 13850135.8.
"Database WPI", Thomson Scientific, XP-002760004, 2 pages, (2009).
Office Action dated May 16, 2017 in JP Application No. 2014-544550.

\* cited by examiner

Fig.9-2
After overnight (60% glycerol)
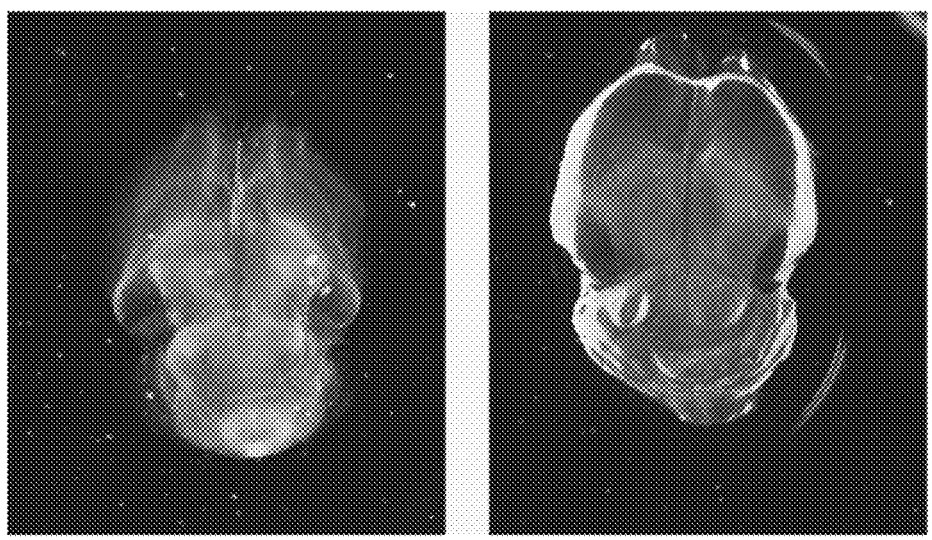
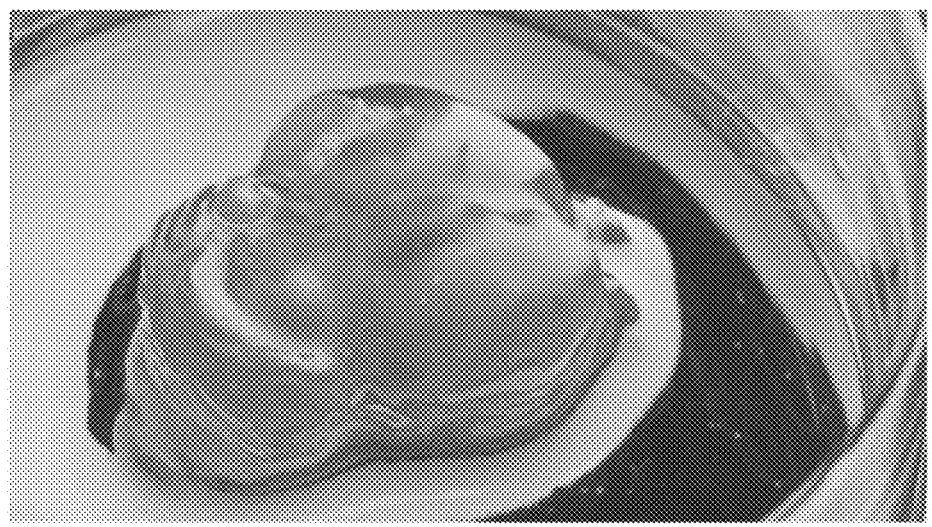

(A)

(B)

After fixing

After Clearing treatment

KIT FOR PRODUCING CLEARED BIOLOGICAL SPECIMENS AND METHOD FOR PRODUCING CLEARED BIOLOGICAL SPECIMENS

CROSS-REFERENCE TO RELATED APPLICATION

This application is a Section 371 of International Application No. PCT/JP2013/079388, filed Oct. 30, 2013, which was published in the Japanese language on May 8, 2014, under International Publication No. WO 2014/069519 A1, and the disclosure of which is incorporated herein by reference.

TECHNICAL FIELD

The present invention relates to kits for producing cleared biological specimens and to methods for producing cleared biological specimens. More specifically, the present invention relates to a kit for producing cleared biological specimens, a kit for storing biological specimens that have been cleared, a method for producing cleared biological specimens, and a method for storing biological specimens that have been producing cleared.

BACKGROUND ART

Techniques of making biological samples clear are necessary for the observation of biological samples and have been known for some time. In recent years, biological samples have often been observed using florescent stains, which have also been used to observe fine tissue such as neurons.

Whole-mount bone staining with alizarin red S is one method of making biological specimens clear that has been in use for some time. Specifically, it is a protocol by which (1) an alkali solution or various digestive enzymes are used to digest tissue (Dingerkus et al., Stain Technology, 52: 229-232, 1977, Nonpatent Reference 1, the entire contents of which are hereby specifically incorporated by reference); (2) a mixed solution of alkali solution and glycerol is used to decolor (segregate) excess stain sites; and (3) substitution is made onto an ascending glycerol series.

There also exist methods of clearing with a mixed solution of benzyl benzoate and benzyl alcohol (Yokomizo et al., Nature Protocols, 7: 421-423, 2012, Nonpatent Reference 2, the entire contents of which are hereby specifically incorporated by reference); Scale reagent, which has a principal component in the form of urea and was reported in 2011 (Hama et al., Nature Neuroscience 14 (11): 1,481 to 1,488, 2011, Nonpatent Reference 3, the entire contents of which are hereby specifically incorporated by reference) (product name SCALEVIEW (registered trademark)); and the like.

SUMMARY OF THE INVENTION

Problem to be Solved by the Invention

Conventional methods of making biological specimens clear mainly present the following problems:
(1) The tissue tends to be damaged in tissue digestion with protein-degrading enzymes or alkali solutions.
(2) Long periods (several days to several months) are required for separate staining with mixed solutions of alkali and glycerol.
(3) Long periods (several days to several months) are required for clearing by glycerol or Scale reagent. Great difficulty is also present in making specific organs clear, such as the brain, liver, and placenta.
(4) Benzyl alcohol and benzyl benzoate mixed solutions are organic solvents, treatment with these mixed solutions weakens the fluorescence signal (Patent Reference 3), and the scope of application, including observation following clearing, is limited.

Based on the above problems, the present invention has for its object to provide a method and a kit for making biological specimens clear that tend not to damage tissue, in which organic solvents such as benzyl alcohol and benzyl benzoate are not employed, that produce transparency in a relatively short time (short period), and which are able to make clear a wide range of biological specimens. A further object of the present invention is to provide a kit and a method for storing in a cleared state biological specimen that has been cleared by the method of the present invention.

Means of Solving the Problems

The method (A) for producing a cleared biological specimen of the present invention comprises:
a step (1) of treating a material to be cleared in the form of a biological specimen with a fixing liquid to obtain a cleared material that has been cleared;
wherein the fixing liquid is (a) an aqueous solution comprising formaldehyde or paraformaldehyde, a nonionic surfactant, an alkali, and a buffer or (b) an aqueous solution comprising formaldehyde or paraformaldehyde, an nonionic surfactant, and an alkali; and
the concentration of the nonionic surfactant in the fixing liquid is 1% or greater.

The method (B) for producing a cleared biological specimen of the present invention comprises:
a step (2) of treating a material being cleared in the form of a biological specimen that has been fixed or a material being cleared that has been treated with a fixing liquid in the method (A) of producing a cleared biological specimen of the present invention with a clearing-promoting liquid to obtain a material that has been cleared;
wherein the clearing-promoting liquid is an aqueous solution comprising a nonionic surfactant and an alkali; and
the concentration of the nonionic surfactant in the clearing-promoting liquid is 1% or greater.

The method (C) for producing a cleared biological specimen of the present invention comprises:
a step (3) of obtaining a material that has been cleared by treating with a storage liquid or storing a material being cleared that has been subjected to a fixing treatment in the method (A) of producing a cleared biological specimen of the present invention or a material being cleared that has been treated with a fixing liquid and a clearing-promoting liquid in the method (B) for producing a cleared biological specimen of the present invention;
wherein the storage liquid is an aqueous solution containing a nonionic surfactant and a polyhydric alcohol; and
the concentration of the nonionic surfactant in the storage liquid is 1% or greater.

The kit (A) for producing cleared biological specimens of the present invention comprises a fixing liquid,
wherein the fixing liquid is (a) an aqueous solution comprising formaldehyde or paraformaldehyde, a nonionic surfactant, an alkali, and a buffer or (b) an aqueous solution comprising formaldehyde or paraformaldehyde, a nonionic surfactant, and an alkali, and the concentration of nonionic surfactant in the fixing liquid is 1% or greater.

In the kit (B) for producing cleared biological specimens of the present invention, which comprises a fixing liquid and a clearing-promoting liquid, the fixing liquid is an aqueous solution containing formaldehyde or paraformaldehyde, a nonionic surfactant, an alkali, and a buffer;

the clearing-promoting liquid is an aqueous solution containing a nonionic surfactant and an alkali; and the concentrations of the nonionic surfactants contained in the fixing liquid and the clearing-promoting liquid are independently each 1% or greater.

In the kit (C) for producing a cleared biological specimen of the present invention comprising either a fixing liquid and a storage liquid or comprising a clearing-promoting liquid and a storage liquid;

the fixing liquid is an aqueous solution comprising formaldehyde or paraformaldehyde, a nonionic surfactant, an alkali, and a buffer;

the clearing-promoting liquid is an aqueous solution comprising a nonionic surfactant and an alkali;

the storage liquid is an aqueous solution comprising a nonionic surfactant and a polyhydric alcohol; and the concentrations of the nonionic surfactants contained in the fixing liquid, the clearing-promoting liquid, and the storage liquid are independently each 1% or greater.

The kit (D) for producing a cleared biological specimen of the present invention comprises a clearing-promoting liquid, wherein the clearing-promoting liquid is an aqueous solution comprising a nonionic surfactant and an alkali; and the concentration of the nonionic surfactant in the clearing-promoting liquid is 1% or greater.

Effect of the Invention

The method for producing cleared biological specimens of the present invention has the following effects in bone staining:

(1) Remarkably shortening the staining period (conventional method: several days to several months; present invention: one to several days);

(2) Greatly shortening the clearing period (glycerol: several days to several months; Scale: several days to several weeks or more; present invention: overnight to several days);

(3) Permitting the staining of large amounts of bone (required for gametogenesis toxicity testing of pharmaceuticals, agricultural chemicals, and the like); and (4) Permitting the automation of bone staining by means of a simple protocol.

The method for producing cleared biological specimens of the present invention has the following effects in examples of applications other than bone staining:

(1) Affording a broad scope of application such as florescence observation and the like due to clearing in a buffering liquid;

(2) Permitting application to alkali phosphatase staining employed in in situ hybridization and whole-mount immunological staining due to being a water-soluble storage solution;

(3) Permitting bone observation through skin that has been cleared without applying bone stain due to the progression of clearing to a degree permitting internal observation in the fixation stage;

(4) Permitting histopathological observation of crystalline lenses in fixed specimens due to the lack of crystalline lens clouding;

(5) Because melanin pigment remains when Tween 20 is employed as the surfactant in the fixing liquid, the distribution of melanocytes spreading in organ tissue that has been cleared can be observed;

(6) With regard to the brain, liver, kidneys, and placenta, which are difficult to make clear by conventional methods, the present invention achieves adequate clearing within a short period (primarily by employing the composition of the present invention as the composition of the fixing liquid); and (7) It is possible to greatly extend the depth to which microscopic observation is possible by applying the present invention to the penetration of thick sections (40 µm or greater) (application as the mounting agent of a tissue specimen is possible).

BRIEF DESCRIPTION OF THE DRAWINGS

FIG. 9-1 shows the results of clearing tests on the brains of mature female C57B6/J (with additional glycerol treatment).

FIG. 9-2 shows the results (continued) of clearing tests on the brains of mature female C57B6/J (with additional glycerol treatment).

MODES OF CARRYING OUT THE INVENTION

Figure 1:
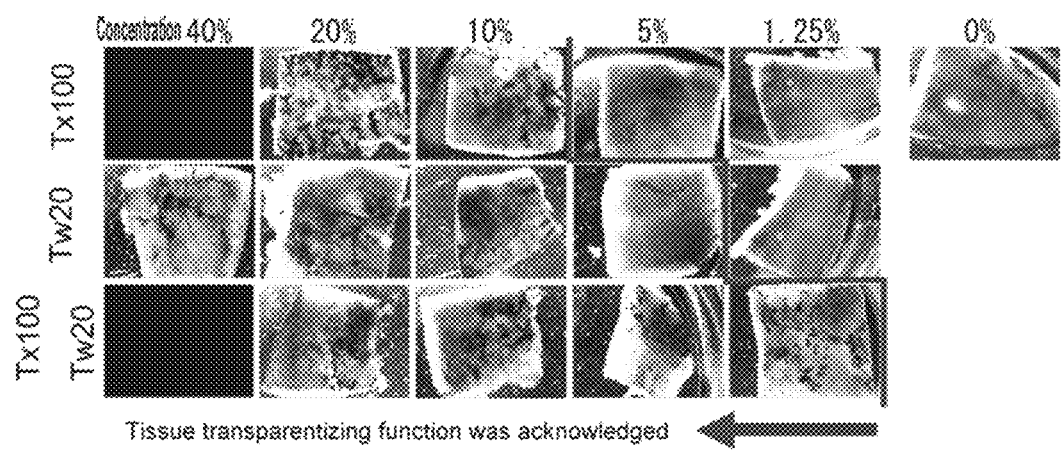
FIG. 1 shows the results of an examination of the relation between clearing and surfactant concentration when employing Triton X100 and Tween 20.

Method (A) for Producing Cleared Biological Specimens

The method (A) for producing cleared biological specimens of the present invention comprises at least step (1) below.

Step (1) of Treating with a Fixing Liquid a Biological Specimen in the Form of a Material being Cleared Step (1)

The fixing liquid employed in step (1) is (a) an aqueous solution comprising formaldehyde or paraformaldehyde, a nonionic surfactant, an alkali, and a buffer or (b) an aqueous solution comprising formaldehyde or paraformaldehyde, an nonionic surfactant, and an alkali. The treatment with the fixing liquid is one that produces moderate digestion and a marked clearing effect while simultaneously fixing tissue, primarily in a material being cleared.

The formaldehyde or paraformaldehyde is a component that fixes the tissue. Formaldehyde and paraformaldehyde can be employed singly, or can be mixed for use. The concentration of the formaldehyde or paraformaldehyde in the aqueous solution is suitably determined from the perspective of permitting suitable tissue fixation. For example, it can fall within a range of 1 to 10 w/v %, desirably falling within a range of 2 to 7 w/v %. However, these ranges are not intended as limitations.

The nonionic surfactant is a component that makes the biological specimen clear. Any surfactant that is nonionic can be employed without restriction. Examples are esters, ethers, ester-ethers, and other forms of nonionic surfactants. Nonionic surfactants in the form of ethers are desirable. Examples of ether nonionic surfactants are Triton X-100 (octylphenolpoly(ethyleneglycolether)$_n$, where n denotes about 10, HLB 13.4 to 13.5) and Tween 20 (polysorbate 20, polyoxyethylene sorbitan monolaurate, HLB 16.7). Tween 20 is a type of polysorbate. This polysorbate has about 20 molecules of ethylene oxide condensed into a sorbitan fatty acid ester. Examples in addition to Tween 20 are Tween 40 (polysorbate 40, polyoxyethylene sorbitan monopalmitate, HLB 15.6), Tween 60 (polysorbate 60, polyoxyethylene sorbitan monostearate, HLB 14.9), Tween 65 (polysorbate 65, polyoxyethylene sorbitan tristearate, HLB 10.5), and Tween 80 (polysorbate 80, polyoxyethylene sorbitan oleate, HLB 15.0).

The nonionic surfactant is a component that makes the biological specimen clear, as set forth above. To make the biological specimen clear, the concentration of the nonionic surfactant in the fixing liquid, for example, falls within a range of 1 to 40 v/v %. The concentration can be suitably selected based on the type of nonionic surfactant and the type of material being cleared. The concentration of the nonionic surfactant in the clearing-promoting liquid desirably falls within a range of 2 to 30 v/v %, preferably within a range of 5 to 25 v/v %. However, these ranges are not intended as limitations. Tween 20 has generally been found to exhibit a clearing effect at lower concentrations that Triton X-100. However, Tween 20 imparts a yellow coloration and there are times when its use at high concentration (5% or higher) is difficult. In bright fields, with the naked eye, and under a microscope, there are cases where a concentration falling within a range of 1 to 5 v/v % is desirable. Triton X100 is desirably incorporated at relatively high concentration and Tween 20 at relatively low concentration. However, when Triton X100 exceeds 30%, the consistency increases sharply. The practical upper concentration limit is 25 v/v %.

As shown in Reference Example 1, as compared to Triton X-100 with an HLB of 13.4 to 13.5, Tween 20 with an HLB of 16.7 exhibits a clearing effect even at low concentration. Thus, there tend to be differences in the clearing effects based on the HLB of the nonionic surfactant. Further, as shown in Reference Example 1, a better clearing effect is achieved when Tween 20 and Triton X-100 are employed in combination as compared to when employed singly. Although the reason for this is unclear, the type and concentration of the nonionic surfactant in the fixing liquid can be suitably selected within ranges that are suited to clearing taking these points into account.

The alkali is a component for biological (protein) digestion and can be a hydroxide of an alkali metal element (such as Li, Na, or K). Specifically, it can be KOH or NaOH. The concentration of the alkali can be suitably determined by taking into account the degree of biological (protein) digestion. For example, it can fall within a range of 0.1 to 10 w/v %, desirably within a range of 0.5 to 2 w/v %.

Fixing liquid (a) contains a buffer in addition to formaldehyde or paraformaldehyde, a nonionic surfactant, and an alkali. Fixing liquid (b) contains formaldehyde or paraformaldehyde, a nonionic surfactant, and an alkali, but not a buffer. The buffer is a component for adjusting the pH of the fixing liquid to within a prescribed range (such as 5 to 12, desirably 7 to 11). The presence of a buffer (for example, pH 5 to 8) further inhibits damage to the tissue by alkali digestion. However, even in fixing liquid (b) which does not contain a buffer, incorporating the above components enables to fix the material being cleared. However, when employing fixing liquid (a) containing a buffer, it is possible to inhibit damage to tissue by the alkali digestion. A single buffer can be incorporated so long as it is a material having a pH-buffering effect. Examples are phosphate buffers (such as phosphoric acid, sodium monohydrogen phosphate, sodium dihydrogen phosphate, potassium monohydrogen phosphate, potassium dihydrogen phosphate, sodium phosphate, potassium phosphate, employed singly or in mixtures) and boric acid-borax buffers. There is no intension to limit to phosphate buffers, but phosphate buffers are desirable.

Specifically, fixing liquid (a) can be a mixed aqueous solution of, for example, 2 to 4% formaldehyde phosphate buffer or 2 to 4% paraformaldehyde phosphate buffer, alkali solution (1% KOH or NaOH), and nonionic surfactant (5% Triton X-100 or Tween 20). Specifically, fixing liquid (b) can be a mixed aqueous solution of, for example, 2-4% formaldehyde aqueous solution or 2 to 4% paraformaldehyde aqueous solution, alkali solution (1% KOH or NaOH), and nonionic surfactant (5% Triton X-100 or Tween 20).

However, the concentrations of the various components are not intended to be limited to the above values. The above are merely examples.

The treatment of the material being cleared with the fixing liquid can be conducted, for example, by immersing the material being cleared in a prescribed quantity (a quantity at least sufficient to fully immerse the material being cleared in the fixing liquid) of fixing liquid at room temperature (for example, at 5 to 35° C., desirably 15 to 30° C., identical below) or at a temperature within a range of 60° C. from room temperature, for a period falling within a range of 1 to 48 hours, desirably within range of 1 to 24 hours, and preferably within a range of 2 to 12 hours. The higher the temperature, the more quickly fixation tends to be completed. However, depending on the type of material being cleared, there may be a risk of greatly damaging the tissue. Thus, the treatment temperature is desirably suitably adjusted taking this point into account. However, the above temperatures and times are merely examples, and no limitation to these ranges is intended. When employing fixing liquid (b), which does not contain a buffer, from the perspective of inhibiting damage to the tissue by alkali digestion, the treatment is desirably conducted at a relatively low temperature, such as at room temperature.

The treatment of the above material being cleared with the fixing liquid can be conducted with irradiation by microwaves during part or all of the treatment operation. The frequency of the microwaves can be, for example, 2.45 GHz, but this is not intended as a limitation. Conducting the above treatment of the material being cleared with the fixing liquid with irradiation by microwaves makes it possible to further promote the clearing. The output of the microwaves being irradiated can be suitably determined taking into account the type and magnitude of the material being cleared and the quantity of fixing liquid.

The biological specimen that is the material being cleared is not specifically limited. For example, the biological specimen can be a fish, amphibian, reptile, or mammal, (however, excluding humans in the case of an entire organism). The biological specimen can also be a biological tissue. Every tissue of an organism can be targeted, such as an internal organ, blood vessel, nerve, the brain, or bone. A cleared specimen of a human organ or the like can be prepared from the view point of technique. For example, such would be suitably conducted in terms of ethical considerations by obtaining the approval of an ethics committee or the like. However, these are merely examples. So long as it is a biological specimen, there is no limitation. However, from the perspective of ease of clearing by means of treatment with a fixing liquid, the material that is being cleared can be a fish, amphibian, bird, mammal, or some tissue thereof.

The biological specimen that is the material that is being cleared can be subjected to a staining treatment in advance. The stain that is used in the staining treatment is not specifically limited. In addition to pigmented ink, stains such as fluorescent stains can also be employed.

Following treatment with the fixing liquid, as needed, the material being cleared can be washed. Distilled water, buffer solution, ethylene glycol/PB(S), or the like can be employed for washing. The washing can be conducted at room temperature.

A bleaching treatment, degreasing treatment, or bleaching and degreasing treatment can be conducted during the treatment of the material being cleared with the fixing liquid, or during the treatment with the fixing liquid and after washing, as needed. For example, hydrogen peroxide can be used for bleaching, and for example, acetone or ethanol can be used for degreasing.

In the method (A) for producing a cleared biological specimen, the treatment of the material being cleared with the fixing liquid yields a material that has been cleared. The material that has been cleared can be used as is in subsequent observation, for example. However, depending on the type of material being cleared, the clearing may sometimes be insufficient. Such materials being cleared can then be subjected to the method (B) for producing a cleared biological specimen of the present invention or the method (C) for producing a cleared biological specimen of the present invention to further promote the clearing. When storage is necessary, storage is desirably conducted by the method (C) for producing a cleared biological specimen of the present invention, described farther below.

Method (B) for Producing Cleared Biological Specimens

The method (B) for producing cleared biological specimens of the present invention comprises a step (2) of treating with a clearing-promoting liquid a material being cleared that has been obtained by fixing a biological specimen by a method other than method (A) for producing a cleared biological specimens of the present invention, or a material being cleared that has been treated with a fixing liquid in method (A) for producing cleared biological specimens of the present invention.

Step (2)

The clearing-promoting liquid that is employed in step (2) is an aqueous solution comprising a nonionic surfactant and an alkali. The same nonionic surfactant and alkali as are employed in the fixing liquid can be employed.

The nonionic surfactant is a component that makes the biological specimen clear. Following fixation, the biological specimen is further cleared by the clearing-promoting liquid. The concentration of the nonionic surfactant in the clearing-promoting liquid, for example, falls within a range of 1 to 40 w/v %, and can be suitably selected based on the type of nonionic surfactant, the type of material being cleared, and the conditions of processing with the fixing liquid (including the composition of the fixing liquid). The concentration of the nonionic surfactant in the clearing-promoting liquid desirably falls within a range of 2 to 20 w/v %, preferably within a range of 5 to 10 w/v %. However, these ranges are not intended as limitations.

As shown in Reference Example 1, there tend to be differences in clearing-promoting effects based on the HLB of the nonionic surfactant. As also shown in Reference Example 1, the clearing-promoting effect that is achieved when Tween 20 and Triton X-100 are employed in combination tends to be better than when they are employed singly. Although the reason for this is unclear, taking these points in account, the type and concentration of the nonionic surfactant can be suitably selected within a range that is suited to promoting clearing.

The alkali is a component for biological (protein) digestion. The concentration thereof can be suitably selected taking into account the degree of biological (protein) digestion in the same manner as for the fixing liquid. For example, it can fall within a range of 0.1 to 10 w/v %, desirably within a range of 0.5 to 2 w/v %. It is not necessary for the clearing-promoting liquid to contain a buffer (but a buffer can be contained as needed). The biological (protein) digesting effect due to the alkali is stronger than that of the fixing liquid. However, since moderate digestion is first conducted by the fixing liquid, even when a clearing-promoting liquid that does not contain a buffer is employed, the tissue is not markedly damaged. However, depending on the type of tissue, the concentration of the alkali is desirably adjusted and clearing is desirably promoted while inhibiting tissue damage.

The material being cleared is a material being cleared that has been treated with a fixing liquid in the method (A) for producing cleared biological specimens of the present invention or a material being cleared that has been obtained by fixing a biological specimen by a method other than the method (A) for producing cleared biological specimens of the present invention. The method other than the method (A) for producing cleared biological specimens of the present invention can be a conventionally known method. For example, it can be a method of treating a biological specimen with an aqueous solution that contains formaldehyde or paraformaldehyde, but does not contain a nonionic surfactant, or does not contain an alkali, or does not contain either. The aqueous solution that contains formaldehyde or paraformaldehyde, but does not contain a nonionic surfactant, or does not contain an alkali, or does not contain either, for example, can contain a 2 to 4% formaldehyde aqueous solution, a 2 to 4% paraformaldehyde aqueous solution, a 2 to 4% formaldehyde phosphate buffer, or a 2 to 4% paraformaldehyde phosphate buffer.

The treatment of the material being cleared with the clearing-promoting liquid, for example, can be conducted by immersing the material being cleared in a prescribed quantity (a quantity at least sufficient to fully immerse the material being cleared in the clearing-promoting liquid) of the clearing-promoting liquid at room temperature (for example, 5 to 35° C., desirably 15 to 30° C., identical below) or at a temperature within a range of 60° C. from room temperature, for a period falling within a range of from 10 minutes to 48 hours, desirably within a range of from 30 minutes to 24 hours, and preferably within a range of from 1 to 12 hours. A high temperature tends to rapidly produce a clearing-promoting effect. However, depending on the type of material being cleared, there is considerable risk of damaging the tissue. Taking this point into account, the treatment temperature is desirably suitably adjusted. However, the above temperatures and times are merely examples and limitation to these scopes is not intended.

The treatment of the material being cleared with the clearing-promoting liquid can be conducted while irradiating microwaves during some portion or all of the treatment operation. The frequency of the microwaves can be, for example, 2.45 GHz. However, this is not intended as a limitation. Conducting the above treatment of the material being cleared with the clearing-promoting liquid while irradiating microwaves makes it possible to promote clearing and rapidly achieve transparency. In particular, conducting the above treatment of the material being cleared with the clearing-promoting liquid with irradiation with microwaves at 40 to 50° C. makes it possible to achieve clearing without damaging the specimen within a relatively short period of about 10 to 90 minutes. The output of the microwaves that are irradiated can be suitably determined by taking into account the type and size of the material being cleared and the quantity of clearing-promoting liquid.

Treating the material being cleared with the clearing-promoting liquid yields a cleared biological specimen. The cleared biological specimen thus obtained can be used as is in subsequent observation, for example. However, depending on the type of material being cleared, there will be cases where adequate clearing is not achieved. Such materials being cleared can then be subjected to the method (C) for producing a cleared biological specimen of the present invention to further promote clearing. In cases where storage is necessary, it is also desirable to apply the method (C) for producing a cleared biological sample of the present invention and conduct storage.

Method (C) for Clearing a Biological Sample

Method (C) for clearing a biological sample of the present invention comprises a step (3) of obtaining a material that has been cleared by treating with a storage liquid or storing a material being cleared that has been subjected to a fixing treatment in the method (A) of producing a cleared biological specimen of the present invention or a material being cleared that has been treated with a fixing liquid and a clearing-promoting liquid in the method (B) for producing a cleared biological specimen of the present invention.

Step (3)

The storage liquid that is used in step (3) is an aqueous solution comprising a nonionic surfactant and a polyhydric alcohol, in which the concentration of the nonionic surfactant is 1% or greater. The nonionic surfactant is a component for clearing the biological sample, and a component that maintains the transparency of the biological sample once it has been cleared. The same nonionic surfactants as are employed in the fixing liquid and the clearing-promoting liquid can be employed.

The concentration of the nonionic surfactant in the storage liquid can fall within a range of 1 to 40%, by way of example. This concentration can be suitably selected based on the type of nonionic surfactant, the type of material being cleared, and the conditions of treatment with the fixing liquid and/or clearing-promoting liquid (including the composition of the fixing liquid and/or that of the clearing-promoting liquid). Keeping the material being cleared in a storage liquid after it has been treated with the clearing-promoting liquid will sometimes further promote clearing and maintain transparency. In the same manner as for the fixing liquid and the clearing-promoting liquid, the HLB of the nonionic surfactant tends to produce differences in the effects of promoting clearing and maintaining transparency. Further, as shown in Reference Example 1, the combined use of Tween 20 and Triton X-100 achieves a better clearing-promoting effect and transparency-maintaining effect than when either is used alone. Although the reason for this is unclear, it is possible to suitably select the type and concentration of the surfactant within ranges suited to maintaining transparency by taking these points into account.

The polyhydric alcohol is a component that promotes clearing. An example is glycol compounds. An example of a glycol compound is ethylene glycol. The concentration of the glycol compound can be suitably determined taking into account the transparency of the specimen. For example, a range of 1 to 50 w/v % is possible, and a range of 10 to 30 w/v % is desirable. However, these ranges are not intended as limitations.

In addition to a nonionic surfactant and a polyhydric alcohol, dimethyl sulfoxide (DMSO) can be incorporated into the storage liquid. Incorporating DMSO further promotes the clearing. The content of DMSO can fall within a range of 0.5 to 10 v/v %, for example. The effect of adding DMSO varies with the type of tissue and organ being treated. In the case of most organs, a range of 0.5 to 10 v/v % is suitable. In the case of the brain, the addition of DMSO causes swelling, so a relatively small quantity falling within a range of 0.5 to 1 v/v % is suitable for long-term storage. For short-term observation, DMSO can be used in a range of up to 10 v/v %.

The material being treated for clearing that has been treated with the fixing liquid and/or clearing-promoting liquid is treated with the storage liquid by being immersed in a prescribed quantity of storage liquid (at least a quantity sufficient to fully immerse the material being cleared in the storage liquid) at room temperature (for example, 5 to 35° C., desirably 15 to 30° C., identical below) or at a temperature falling within a range of 60° C. from room temperature for a period falling within a range of from 10 minutes to 48 hours, desirably within a range of from 30 minutes to 24 hours, and preferably falling within a range of from 1 to 12 hours. A high temperature tends to rapidly produce a clearing-promoting effect. However, depending on the type of material being cleared, there is a risk of great damage to the tissue. The treatment temperature is desirably suitably adjusted taking this point into account. However, the above temperature and periods are merely examples, and are not intended as limitations. In the case of storage, it is possible to store at room temperature as is.

The treatment of the material being cleared with the storage liquid can be conducted with microwave irradiation during part or all of the treatment operation. The frequency of the microwaves can be 2.45 GHz, for example, but this is not intended as a limitation. Treating the material being cleared with the storage liquid while irradiating it with microwaves promotes the clearing, making it possible to rapidly achieve clearing. Specifically, at a temperature of 40 to 50° C., treating the material being cleared with the storage liquid while irradiating it with microwaves makes it possible to relatively rapidly achieve clearing in about 10 to 90 minutes without damaging the specimen. The output of the microwaves being irradiated can be suitably determined by taking into account the type and size of the material being cleared, the quantity of storage liquid, and the like.

Treating the material being cleared with the fixing liquid makes it possible to obtain a cleared biological specimen. The cleared biological specimen obtained can be subsequently used as is for observation, for example, or can be stored as is. However, depending on the type of material being cleared, clearing will sometimes be inadequate. For such materials being sized, repeatedly implementing steps (2) and (3) will promote the clearing. Alternatively, when clearing is insufficient, treatment can be conducted with the following additional clearing-promoting liquid. Treatment with an additional clearing-promoting liquid can also be implemented on the cleared biological specimen obtained by the method of (A) or (B) for clearing a biological specimen.

<Treatment with Additional Clearing-Promoting Liquid>

The cleared biological specimen obtained by methods (A) to (C) for clearing a biological specimen of the present invention can be immersed in an additional clearing-promoting liquid comprised of a trivalent alcohol or an aqueous solution of a trivalent alcohol. The material being cleared that is obtained following immersion in the additional clearing-promoting liquid can then be maintained in the above storage liquid to obtain a cleared material. Trivalent alcohol is a component that further promotes clearing. This treatment will sometimes further promote clearing. An example of a trivalent alcohol is glycerol. Treatment with an additional clearing-promoting liquid is effective when increasing the transparency of bone and nerve fiber, for example.

The treatment with an additional clearing-promoting liquid of the material being cleared that has been treated with a fixing liquid, clearing-promoting liquid, or storage liquid is conducted, for example, by immersion in a prescribed quantity of additional clearing-promoting liquid (a quantity at least adequate to fully immerse the material being cleared in the additional clearing-promoting liquid) at room temperature (for example, from 5 to 35° C., desirably 15 to 30° C., identical below) or at a temperature falling within a range of 60° C. from room temperature for a period falling within a range of from 30 minutes to 48 hours, desirably within a range of from 1 to 24 hours, and preferably within a range of from 1 to 12 hours. A high temperature tends to rapidly produce a clearing-enhancing effect. However, depending on the type of material being cleared, there is a risk of great damage to the tissue. It is thus desirable to suitably adjust the treatment temperature by taking this point into account. However, these temperatures and periods are merely examples; these ranges are not intended as limitations.

Treatment of the above material being cleared with an additional clearing-promoting liquid can be conducted by irradiating microwaves during part or all of the treatment operations. The frequency of the microwaves can be 2.45 GHz, for example. However, this is not intended as a limitation. Conducting treatment of the material being cleared with the additional clearing-promoting liquid while irradiating it with microwaves further promotes clearing and makes it possible to rapidly achieve clearing. Specifically, at a temperature of 40 to 50° C., conducting treatment of the material being cleared with the additional clearing-promoting liquid while irradiating it with microwaves makes it possible to achieve clearing within a relatively short period of about 10 to 90 minutes without damaging the specimen. The output of the microwaves being irradiated can be suitably determined taking into account the type and size of the material being cleared, the quantity of additional clearing-promoting liquid, and the like.

The example of a basic protocol (steps 1 to 4) for clearing a tissue using treatment with a fixing liquid (1), treatment with a clearing-promoting liquid (2), and treatment with a storage liquid (3) will be given below.

Step 1. Fixing Liquid for Producing Cleared Specimens: Room Temperature, Several Hours to Several Days
(a) A mixed solution of 2 to 4% formaldehyde phosphate buffer or 2 to 4% paraformaldehyde phosphate buffer, 5% Triton X-100 or 5% Tween 20, 1% KOH;
(b) A mixed solution of 2 to 4% formaldehyde aqueous solution or 2 to 4% paraformaldehyde aqueous solution, 5% Triton X-100 or 5% Tween 20, 1% KOH.

Step 2. Washing: 30 Minutes to Overnight at Room Temperature
(i) Distilled water or
(ii) Tris-HCL buffer liquid (TB(S), pH 7.5), or
(iii) Phosphate buffer solution (PB(S), pH 7.2 to 7.4), or
(iv) 40% ethylene glycol/PB(S)
(Optional: bleaching and degreasing)
Bleaching: (i) Mixed solution of 0.3% hydrogen peroxide aqueous solution, 50% (70 to 50%) acetone, 50% (30 to 50%) ethylene glycol or
(ii) Mixed solution of 0.3% hydrogen peroxide aqueous solution, 50% ethanol, 50% ethylene glycol, room temperature, several hours to overnight.
Degreasing: (i) Mixed solution of 50% (70 to 50%) acetone, 50% (30 to 50%) ethylene glycol, or
(ii) mixed solution of 50% ethanol, 50% ethylene glycol, room temperature, several hours to several days, or
(iii) mixed solution of 50% ethanol and 50% glycerol
 Degreasing effect of (i) acetone mixed solution is good.
 For mature mouse brain, 1 day of bleaching and 1 to 2 days of degreasing are suitable.
For mature rat brain, one day of bleaching and 2 to 3 days of degreasing are suitable.

Step 3. Tissue Clearing-Promoting Liquid: Room Temperature or 50° C., 30 Minutes to 2 Days
Clearing-promoting liquid 1: 20% (5 to 20%) Triton X-100, 1% KOH or
Clearing-promoting liquid 2: 20% (5 to 20%) Tween 20, 1% KOH or
Clearing-promoting liquid 3: 10% (5 to 20%) Triton X-100, 10% (5 to 25%) Tween 20, 1% KOH
Clearing-promoting effect: Promoting liquid 3>promoting liquid 1>promoting liquid 2

Step 4. Cleared Specimen Storage Liquid: Room Temperature or 50° C., 30 Minutes to 2 Days (Clearing is Promoted at 50 to 60° C.)
Storage liquid 1: 20% (5 to 20%) Triton X-100, 20% ethylene glycol or
Storage liquid 2: 20% (5 to 20%) Tween 20, 20% ethylene glycol or
Storage liquid 3: 25% (5 to 25%) Triton X-100, 5% (5 to 1%) Tween 20, 20% ethylene glycol
Storage liquid 4: 20% (5 to 20%) Triton X-100, 20% ethylene glycol, 10% (0.5 to 10%) DMSO (dimethyl sulfoxide) (pH 8 to 9)
Clearing-promoting effect: storage liquid 4>storage liquid 3>storage liquid 1>storage liquid 2

When the transparency of the specimen obtained in step 4 is inadequate, it is possible to further enhance transparency by repeatedly conducting step 3 with the clearing-promoting liquid and step 4 with the storage liquid. In that case, any one of clear specimen storage liquids 1 to 4 can be used for storage (transparency: 4>3>1>2).

Step 5

When it is desirable to further enhance the transparency of the specimen, or when it is desirable to enhance the transparency of bone, nerve fiber, or the like, treatment with the following additional clearing-promoting liquid can be added. The additional clearing-promoting liquid is either a 100% glycerol solution or an aqueous solution with 50% or more glycerol. The higher the glycerol concentration, the greater the additional clearing-promoting effect. An example of a specific protocol is given below.

5.1 Emulsification: Incubation at Room Temperature for from 30 Minutes to Several Hours in 100% Glycerol.

Emulsification begins simultaneously with the introduction of the specimen. The solution assumes a milk-white color. Simultaneously, clearing of the specimen progresses rapidly and it hardens. In the cleared specimen storage liquid of step 4, tissue swelling is observed. However, shrinkage occurs during the glycerol treatment.

5.2 Storage: The specimen of 5.1 is further treated with 60% glycerol. Treatment with 60% glycerol rather than 100% glycerol yields a specimen of higher transparency. In this processing, some turbidity and swelling (+) occur overnight. Following the treatment of 5.2, storage in storage liquid 1 (25% Triton X-100, 5% Tween 20, ethylene glycol) or storage liquid 3 (20% Triton X-100, 5% Tween 20, 20% ethylene glycol) immediately enhances transparency. Transparency in the case of brain is: storage liquid 1>storage liquid 3 (for liver, storage liquid 1<storage liquid 3).

- In soft tissue treated with additional clearing-promoting liquid, the transparency increases sharply.
- Treatment with the additional clearing-promoting liquid is particularly suited to clearing of brain.
- In the treatment of steps 1 to 4, a milk-white sediment will sometimes be produced in fiber of white matter (identical in ossified portions). An effective treatment for removing this is heating at 50 to 60° C. However, when 72 hours are exceeded, sudden dissolution (collapsing) and liquefaction of the brain sometimes occur. Thus, it is desirable to suitably manage the temperature and duration.
- In treatment with the additional clearing-promoting liquid, the color of ossified portions where white has been intensified in fetuses will decrease (become cleared). Accordingly, when it is desirable for the bone not to be seen, treatment with the additional clearing-promoting liquid is effective.

<Kit for Producing Cleared Biological Specimens>

The kits for producing cleared biological specimens of the present invention include a kit (A) comprising a fixing liquid, a kit (B) comprising a fixing liquid and a clearing-promoting liquid, a kit (C) comprising a fixing liquid and a storage liquid or a fixing liquid, a clearing-promoting liquid, and a storage liquid, and a kit (D) comprising a clearing-promoting liquid, respectively.

The fixing liquid is an aqueous solution comprising (a) formaldehyde or paraformaldehyde, a nonionic surfactant, an alkali, and a buffer, or (b) an aqueous solution comprising formaldehyde or paraformaldehyde, a nonionic surfactant, and an alkali. Fixing liquid (b) does not contain a buffer. The clearing-promoting liquid is an aqueous solution comprising a nonionic surfactant and an alkali. The storage liquid is an aqueous solution comprising a nonionic surfactant and a polyhydric alcohol. The concentration of the nonionic surfactant in the fixing liquid, clearing-promoting liquid, and storage liquid is 1% or greater in each independently. The composition, concentration, and the like of the fixing liquid, clearing-promoting liquid, and storage liquid are identical to those set forth above for methods (A), (B), and (C) for producing cleared biological specimens.

The kits of the present invention can be suitably employed in methods (A) to (C) for producing cleared biological specimens of the present invention.

The kits of the present invention can further contain an additional clearing-promoting liquid comprised of a trivalent alcohol solution or a trivalent alcohol-containing aqueous solution. An example of a trivalent alcohol is glycerol. The composition, concentration, and the like of the additional clearing-promoting liquid is the same as that set forth above for the method for producing cleared biological samples and the treatment with an additional clearing-promoting liquid.

EXAMPLES

The present invention will be described in greater detail below through Examples. However, the present invention is not intended to be limited by these Examples. The storage liquid 3 and promoting liquid 3 in the Examples have been described in the above protocol.

Reference Example 1

Examination of the Composition of the Clear Specimen Storage Liquid (1) Examination of Triton X-100 and Tween 2 Concentrations The livers of mature rats that had been subjected to intravenous injection of pigment ink were employed as specimens.

Following perfusion of a mixed solution of 2% formaldehyde (paraformaldehyde) phosphate buffer, 5% Triton X-100, and 1% KOH, immersion and fixation were conducted for 12 hours in the same fixing liquid, followed by storage at room temperature in 40% ethylene glycol/PB (phosphate buffer).

(Setting Concentration Conditions and Determining Effects)

Triton X-100 (Tx100): 20%, 10%, 5%, 1.25%

Tween 20 (Tw20): 40%, 20%, 10%, 5%, 1.25%

Tx+Tw (each in identical concentration): 20%, 10%, 5%, 1.25%

Containing neither Tx nor Tw: 0%

Following 24 hours of incubation at room temperature, the blood vessels within the liver (stained black with ink) were used as indicators and the transparency of tissue was evaluated under a stereomicroscope. The results are given in FIG. 1.

- Because 40% Triton 100 solidified at room temperature, it was not examined.
- The treated groups to the left of the red line were found to exhibit a clearing effect.
- When Triton X-100 and Tween 20 were employed alone, a clearing effect was observed. However, a mixed liquid of the two exhibited a clearing effect beginning in the low concentration range.

Example of Sample Preparation

Example 1

Clearing Killifish and Tree Frogs

Figure 2:
FIG. 2 shows the results of clearing tests on killifish.
Figure 3:
FIG. 3 shows the results of clearing tests on tree frogs.

<Conditions>
(1) Fixation
Mixed solution of 2% formaldehyde (paraformaldehyde) phosphate buffer, 5% Triton X-100, and 1% KOH
Room temperature, 1 hour to overnight
(2) Washing
Phosphate buffer physiological saline (PBS, pH 7.2 to 7.4)
Room temperature, 30 minutes
(3) Tissue Clearing-Promoting Liquid
Promoting liquid: 20% Tween 20, 1% KOH
Room temperature, 10 to 30 minutes
(4) Cleared Specimen Storage Liquid
20% Triton X-100, 5% Tween 20, 20% ethylene glycol (storage liquid 3)
Room temperature, 10 to 30 minutes.
<Results>
The results are given in FIG. 2. In the conventional clearing treatment method, about several days to a week (not including the fixation period) are required to complete clearing. The present method is characterized in that the entire specimen becomes clear like glass. It is also characterized in that when compared to a clear specimen prepared with convention glycerol or Scale reagent, the transparency is much higher and the tissue is harder. In the killifish shown in FIG. 2, the skin, muscle, and internal organs all remain. Melanin pigment remains. In the tree frog shown in FIG. 3, the skin and muscle remain. It is possible to see through to the internal organs.

Example 2

Clearing Mouse Fetus (at Day 14 of Gestation) and Newborn Mouse (at Day 2 after Birth)

Figure 4:
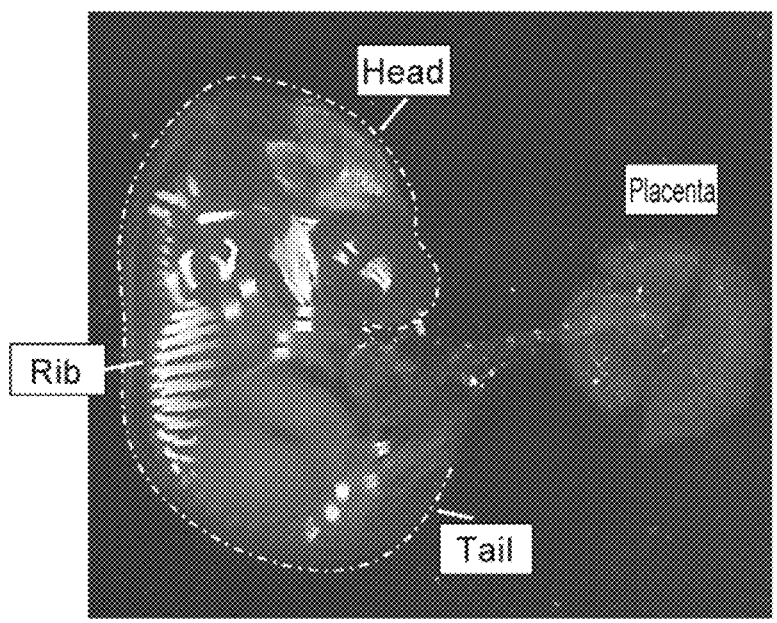
FIG. 4 shows the results of clearing tests on mouse fetuses (at 14 days of gestation).
Figure 5:
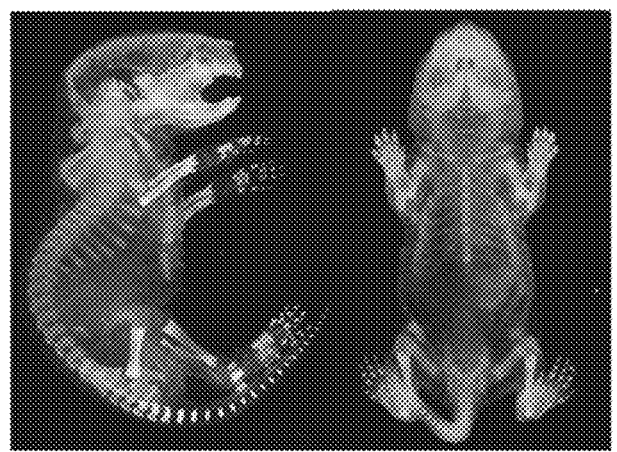
FIG. 5 shows the results of clearing tests on newborns (at two days after birth).

<Conditions>
(1) Fixation
Mixed solution of 2% formaldehyde (paraformaldehyde) phosphate buffer, 5% Triton X-100, 1% KOH
Room temperature, 1 hour to overnight
(2) Washing
Phosphate buffer physiological saline (PBS, pH 7.2 to 7.4)
Room temperature, 30 minutes
(3) Bleaching (Just Newborn Mouse)
Mixed solution of 0.3% hydrogen peroxide aqueous solution, 50% acetone, 50% ethylene glycol,
Room temperature, 1 hour
(4) Clearing Treatment
20% Triton X-100, 5% Tween 20, 20% ethylene glycol (storage liquid 3)
Room temperature, overnight
(5) Treatment to Promote Clearing of Tissue
10% Triton X-100, 10% Tween 20, 1% KOH (promoting solution 3)
Room temperature, 1 hour (fetus), overnight to several days (newborn)
(6) Clearing Treatment
20% Triton X-100, 5% Tween 20, 20% ethylene glycol (storage liquid 3)
Room temperature, 30 minutes, overnight to several days (newborn)
<Results>
The results are given in FIGS. 4 and 5. With the conventional clearing treatment method, about several days to a week are required to achieve clearing (excluding the fixation period). The present method is characterized in that the entire specimen becomes cleared like glass. It is also characterized in that when compared to a cleared specimen prepared with convention glycerol or Scale reagent, the transparency is much higher and the tissue is harder. Simultaneously with clearing, ossified portions are intensified in white (which is thought to be the effect of Tween 20 or both Tween 20 and ethylene glycol). A sensitivity equal to or better than that of bone staining with Alizarin Red is exhibited.

As shown in FIG. 4, the E14 mouse fetus was highly cleared. The degree of transparency was so high that it was difficult to recognize soft tissue with the naked eye. In addition to clearing of soft tissue, portions in extremely early stages of ossification were stained white (presumed to be the effect of Tween 20). Thus, without conducting separate bone staining, application as a bone staining method of extremely high sensitivity was possible (cartilage portions were not stained). The placenta was also cleared.

In the two-day-old newborn mouse shown in FIG. 5, clearing was achieved with the lanugo, skin, internal organs, and the like all still remaining. The shadows of internal organs in the abdomen were observed from the body surface. The bones were stained and emphasized (thought to be the effect of Tween 20).

Example 3

Clearing Digestive Tract Tissue of Mature Mouse (Ink Injected Through Arteries)

Figure 6:
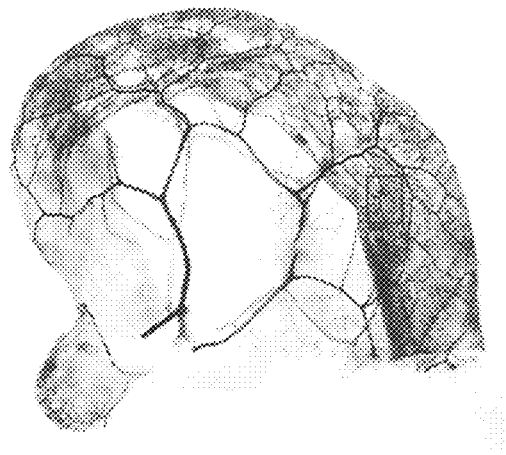
FIG. 6 shows the results of clearing tests on the small intestines of mature mice.
Figure 6:
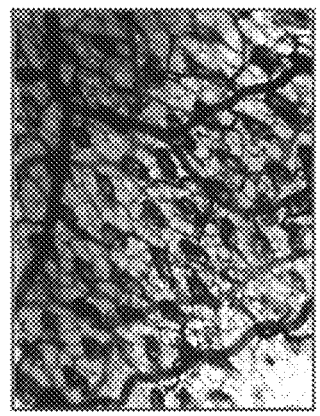
Figure 7:
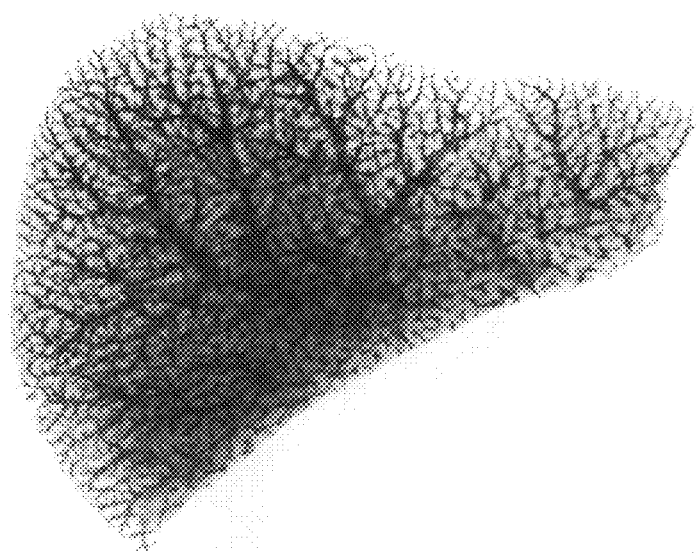
FIG. 7 shows the results of clearing tests on the livers of mature mice.

<Conditions>
(1) Fixation
Mixed solution of 2% formaldehyde (paraformaldehyde) phosphate buffer, 5% Triton X-100, 1% KOH
Room temperature, 1 hour to overnight
(2) Washing
Phosphate buffer physiological saline (PBS, pH 7.2 to 7.4)
Room temperature, 30 minutes
(3) Degreasing
Mixed solution of 50% acetone, 50% ethylene glycol
Room temperature, several hours to overnight
(4) Clearing Treatment
20% Triton X-100, 5% Tween 20, 20% ethylene glycol (storage liquid 3)
Room temperature, 30 minutes to 1 hour
<Results>
The results are given in FIGS. 6 and 7.

In the case of specimens with tissue thicknesses of about 1 to 2 mm, such as the digestive tract and abdominal wall, in the stage of fixation with the fixing liquid for cleared specimens, the tissue became adequately cleared (fixation alone permitted observation of the interior).

In portions of the small intestinal wall and the like where degreasing was unneeded, an adequate clearing treatment was completed in about 3 hours. The transparency was quite high.

For the liver, the elimination of bilirubin progressed by lengthening the fixation period and transparency was enhanced. In the degreasing stage, an aqueous solution of hydrogen peroxide was added to a final concentration of 0.3% and bleaching was conducted for from several hours to overnight, making it possible to remove almost all of the coloration from the tissue.

In the small intestine of the mature mouse shown in FIG. 6, the capillary vessel network within the intestinal villi became visible.

In the liver of a mature mouse shown in FIG. 7, the arteries distributed throughout the liver could be observed in great detail.

Example 4

Clearing the Brain of a Mature Mouse (Part 1)

<Conditions>
(1) Fixation
Mixed solution of 2% formaldehyde (paraformaldehyde) phosphate buffer, 5% Triton X-100, 1% KOH
Room temperature, 1 hour to overnight
(2) Washing
Phosphate buffer physiological saline (PBS, pH 7.2 to 7.4)
Room temperature, 30 minutes
(3) Bleaching
Mixed solution of 0.3% hydrogen peroxide aqueous solution, 50% acetone, 50% ethylene glycol
Room temperature, 24 hours
(4) Degreasing
Mixed solution of 50% acetone, 50% ethylene glycol
Room temperature, several hours to overnight
(5) Clearing Treatment
20% Triton X-100, 5% Tween 20, 20% ethylene glycol (storage liquid 3)
Room temperature or 50° C., 24 hours or more
[6] Tissue Clearing-Promoting Treatment
10% Triton X-100, 10% Tween 20, 1% KOH (promoting liquid 3)
Room temperature or 50° C., 24 to 48 hours
(7) Clearing Treatment, Storage
20% Triton X-100, 5% Tween, 20% ethylene glycol (storage liquid 3)
<Results>

Figure 8:
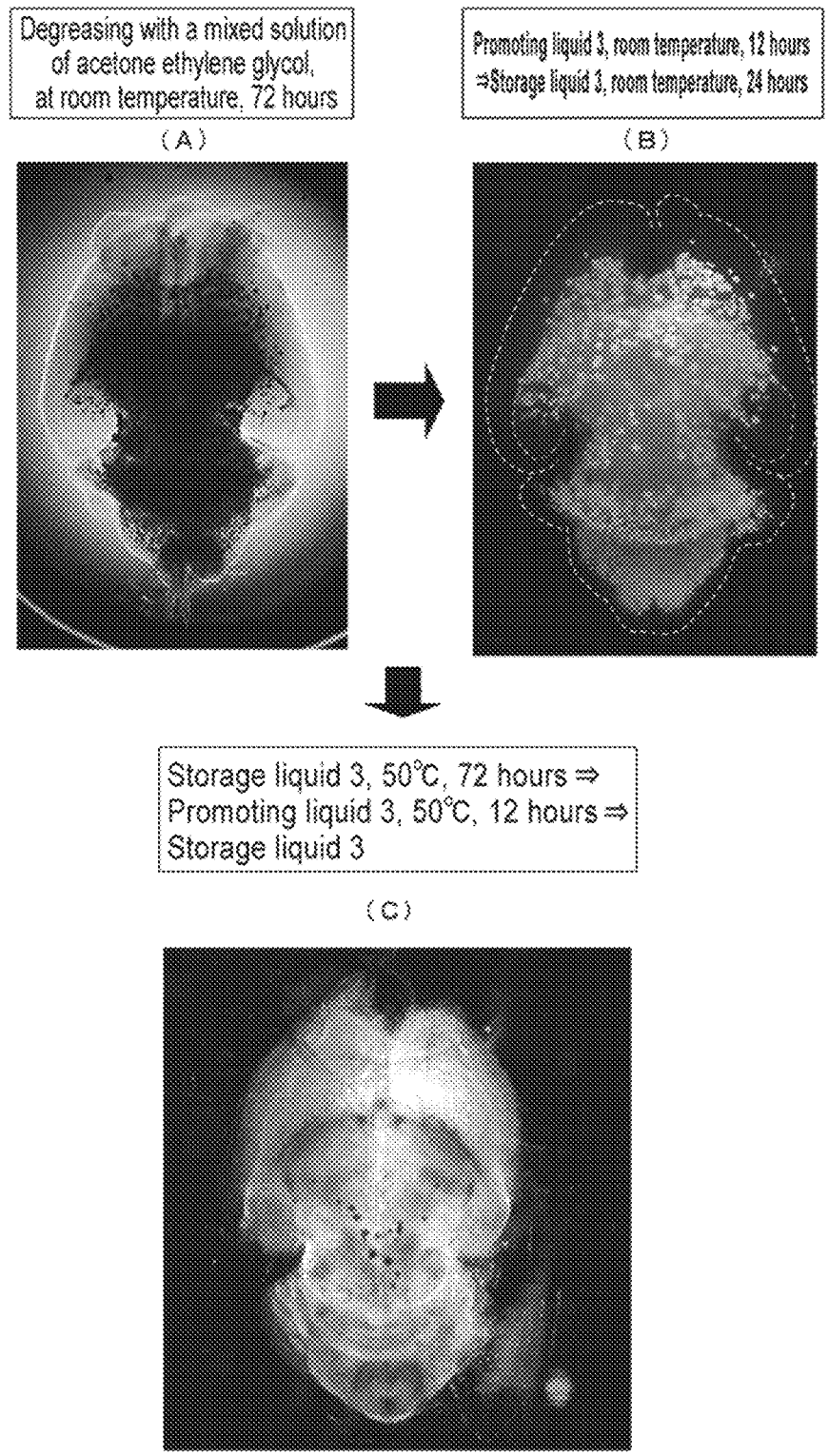
FIG. 8 shows the results of clearing tests on the brains of mature female C57B6/J.
Figures 1, 9:
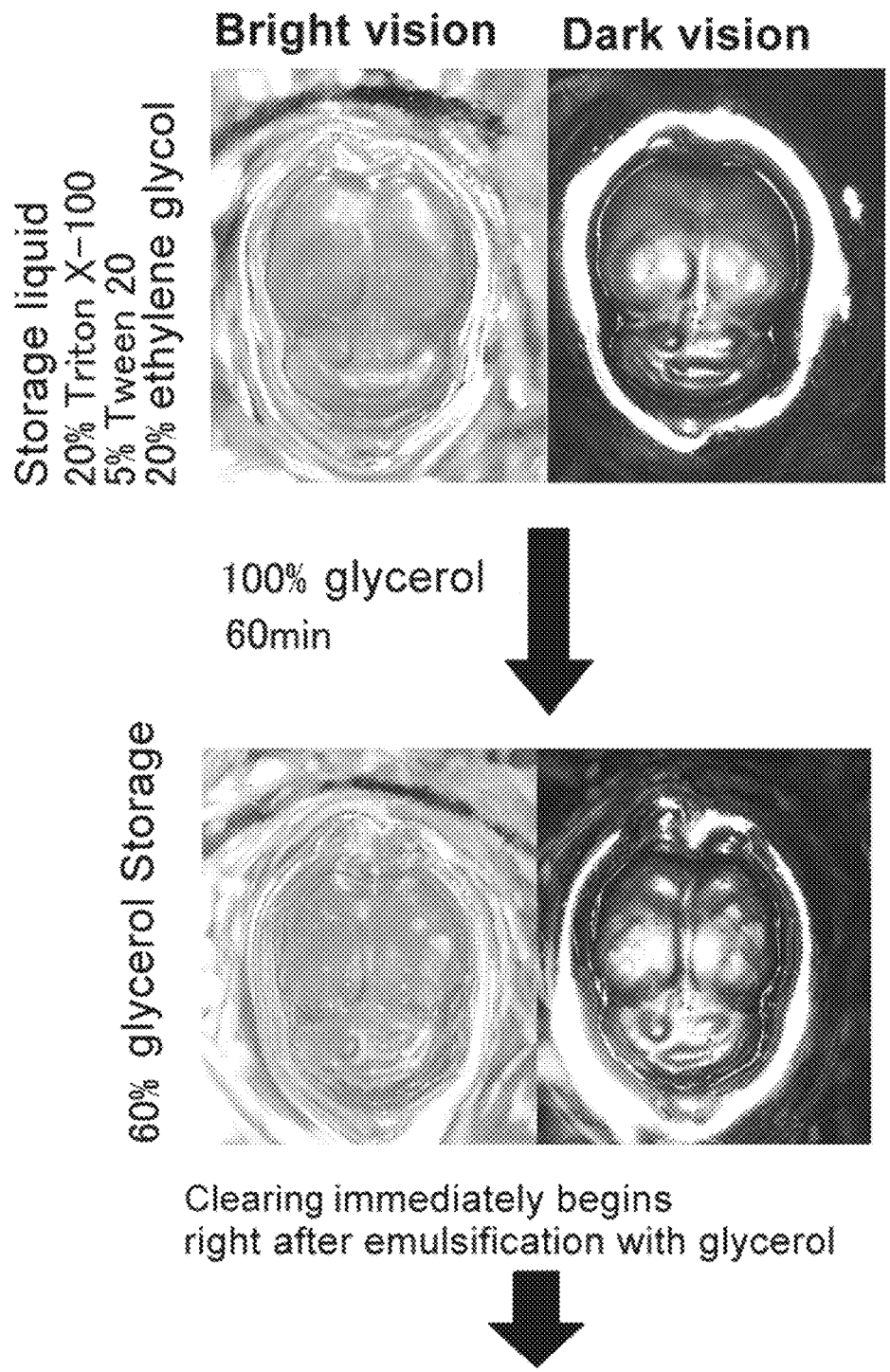

The results are given in FIGS. 8 and 9.

The gray matter in the cerebral neocortex did not require bleaching or degreasing treatment. Incubation for 12 hours each in the promoting liquid and storage liquid achieved clearing. Clearing progressed to a degree that made viewing by eye difficult.

FIG. 8 shows the brain of a mature female C57B6/J mouse. Following treatment with a mixed solution of 2% formaldehyde phosphate buffer, 5% Triton X-100, and 1% KOH (room temperature, overnight), degreasing was conducted with a mixed solution of acetone and ethylene glycol at room temperature for 72 hours. The results are given in FIG. 8(A). Results obtained by treatment with promoting liquid 3 (room temperature, 12 hours) and storage liquid 3 (room temperature, 24 hours) are given in FIG. 8(B). The gray matter was extremely cleared, but a milk-white precipitate formed in the white matter (nerve fiber).

The milk-white precipitate component that formed in the white matter (nerve fiber) was unknown. However, the precipitate was removed by incubation for 12 to 48 hours at 50° C. in storage liquid 3. The results are given in FIG. 8(C). The white precipitate nearly completely disappeared, but some turbidity was found in the white matter fiber with dark field observation. It was possible to observe under a microscope the blood vessels running beneath the outer surface of the brain from the dorsal cortex surface.

An additional treatment with glycerol further enhanced the clearing (particularly the clearing of white matter). The results are given in Tables 9-1 and 9-2. Transparency with storing liquid 3 was adequately high, but transparency fell off somewhat in the deep white matter (nerve fiber). When a brain that had been cleared with the storage liquid was placed in 100% glycerol, the transparency of the entire specimen was rapidly and markedly enhanced, and the turbidity in the white matter disappeared. Better results (enhanced transparency) were achieved for storage in the present experiment by returning to storage liquid 3 rather than 60% glycerol.

Example 5

Clearing the Brain of an ICR Mature Mouse (9 Weeks, Male) (Part 2)

<Conditions>
(1) Fixation
Storage for several months in fixing liquid of 2% PFA (paraformaldehyde), 5% Triton X-100, 0.5% KOH until use
(2) Pretreatment (Washing)
20% ethylene glycol, 5% Triton X-100, 1% KOH, room temperature, overnight
(3) Storage Liquid (Clearing Treatment 1)
20% ethylene glycol, 25% Triton X-100, pH 8.5, room temperature, overnight (several hours were adequate)
(4) Storage Liquid (Clearing Treatment 4)
20% ethylene glycol, 20% Triton X-100, 10% DMSO, pH 8.5, room temperature, overnight (several hours were adequate)
<Results>

Figure 10:
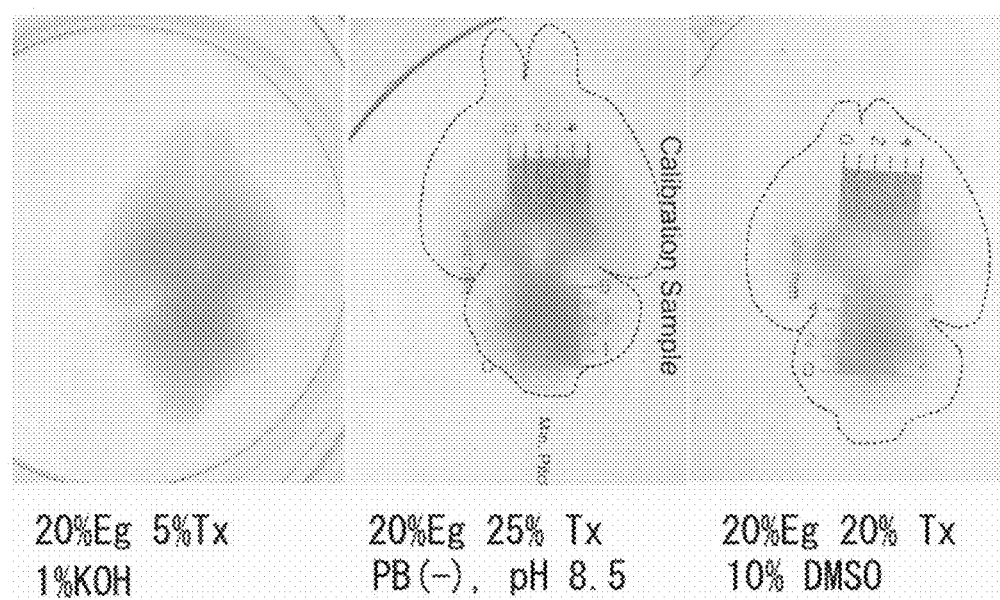
FIG. 10 shows the results of clearing tests on the brains of mature ICR mice (9 weeks, male).

The results (photographs) following each of the treatments of (2), (3), and (4) above are shown in FIG. 10.

In Example 5, the glycerol and heating that were employed in Example 4 were unnecessary. In the treatment of (2), clearing progressed, but clearing was nearly complete after the treatment of (3). Following the treatment of (4), clearing progressed to a degree that made viewing by eye difficult. In the present Example, the storage liquid of (4) contained 10% DMSO, causing the specimen to swell. This was suited to observation for a short period. The present Example provides the example of the brain. However, the fact that clearing progresses to the same degree in the lung has also been confirmed. In the case of the lung, there was no swelling of the specimen even when the storage liquid of (4) contained 10% DMSO.

Example 6

Foreleg of Mature Rat (with Arterial Injection of Ink)

Figure 11:
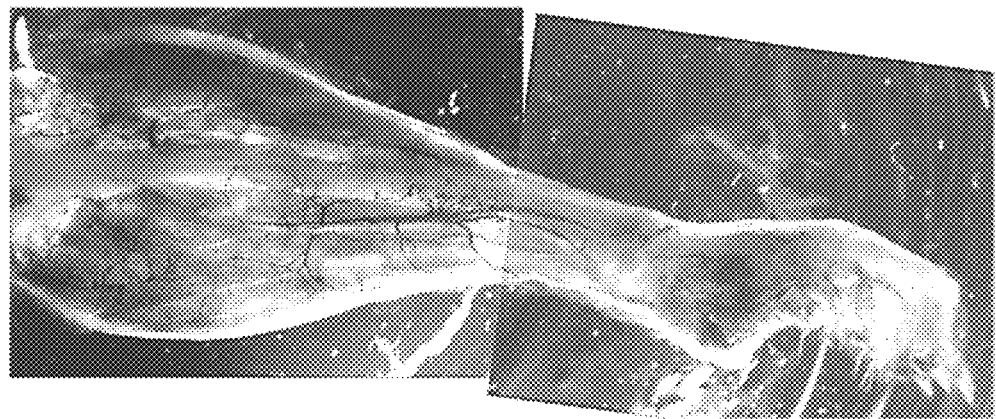
FIG. 11 shows the results of clearing tests on the forelegs of mature rats.
Figure 11:
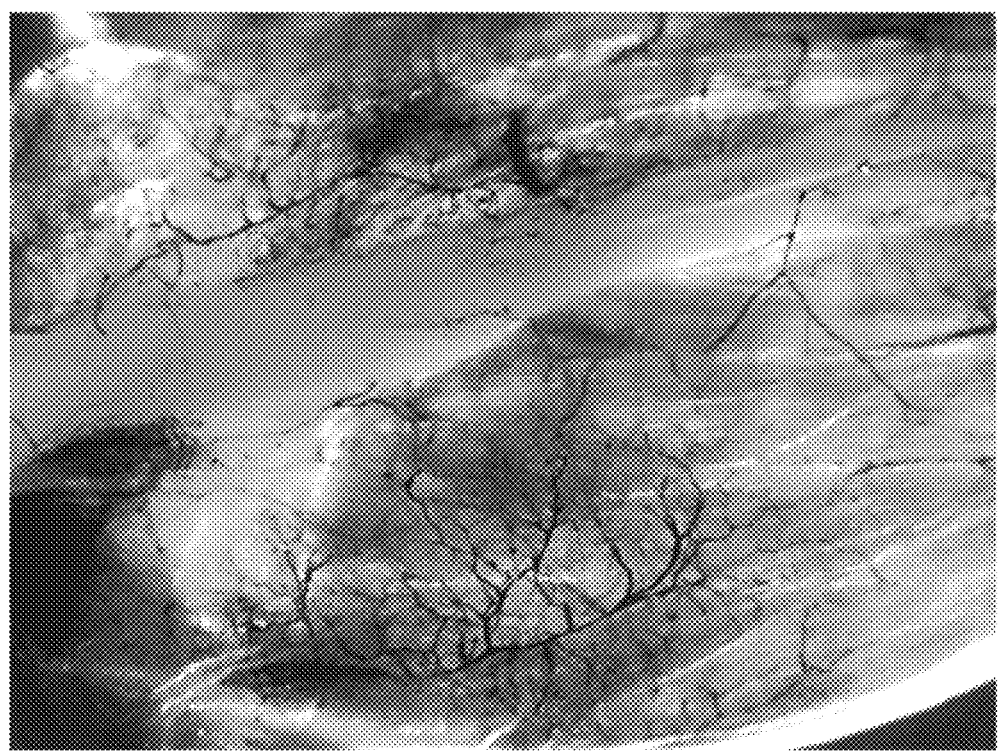

The process of producing the specimen was based on the process of producing the brain specimen described in Example 4. The results are given in FIG. 11.

Clearing was conducted with all the muscles remaining. The bones were clearly evident through the thick muscle of the forelegs.

The blood vessel network distributed within the muscle was visible.

Muscle fiber running through the focus plane of a microscope could be made out (observation such as tomographic imaging was possible).

Example 7

Rapid Muscle Staining Method

<Conditions>
(1) Fixation: Overnight to Several Days, Room Temperature 2% formaldehyde (paraformaldehyde) phosphate buffer, 5% Triton X-100, 1% KOH Following fixation, clearing was immediately begun.

The color was steadily stripped away. Red was particularly well removed. However, melanin tended not to be removed.

When adequate clearing was conducted in advance in this stage, the decoloration and separation period following bone staining was greatly reduced.

When the skin was removed in advance, the clearing period was shortened. However, even when the skin was left on, adequate clearing was achieved.

For killifish, overnight fixation was suitable. A glasslike state was achieved by several days in fixing liquid.

Overnight fixation was suitable for a loach. However, the body color was not adequately removed. When 2 to 3 weeks were used to obtain pure white, followed by staining, completion required about half a day.

(2) Skin Removal (an Option when the Skin Gets in the Way of Goals Such as Bone Staining)

It is suggested that the skin be removed after several hours of fixation.

When the skin is removed prior to fixation, clearing becomes extremely rapid, but the sample tends to fall apart when the skin is removed.

When clearing is adequately advanced by several days of fixation, skin removal is greatly facilitated.

When one takes one's time with this method, the skin is adequately penetrated, so skin removal is unnecessary.

(3) Bone Staining: Room Temperature, 2 Hours
0.05% alizarin red S, 1% KOH, 1% Tween 20 (or 1% Triton X-100)

(4) Promoting Clearing and Washing: 50° C., Several Hours to Overnight, Clearing-Promoting Liquid 2: 20% Tween 20, 1% KOH When removal of the stain liquid is poor and clearing does not progress adequately, any one of the following clearing-promoting liquids can be employed.

Clearing-promoting liquid 1: 20% Triton X-100, 1% KOH, 50° C.

Clearing-promoting liquid 3: 10% Triton X-100, 10% Tween 20, 1% KOH

In fish and frogs, clearing-promoting liquid 2 is suitable. For mammals, clearing-promoting liquid 3 is good.

When the specimen becomes semi-cleared during fixation, the staining step can be ended after 3 to 4 hours.

Washing can be conducted at room temperature, but slow washing at 50° C. is desirable.

At neutral to acid pH, acute tissue degradation occurs. Thus, KOH is added to the clearing-promoting liquid.

(5) Cleared Specimen Storage Liquid
Storage liquid 3: 20% Triton X-100, 5% Tween 20, 20% ethylene glycol Storage liquid 3 sometimes achieved greater transparency than glycerol (particularly in the case of tissue from mammals).

In methods of clearing by glycerol substitution, the time required following fixation to the completion of staining is from several days to a week in killifish, frogs, and the like. This was completed in from half a day to a day by the present method.

Figure 12:
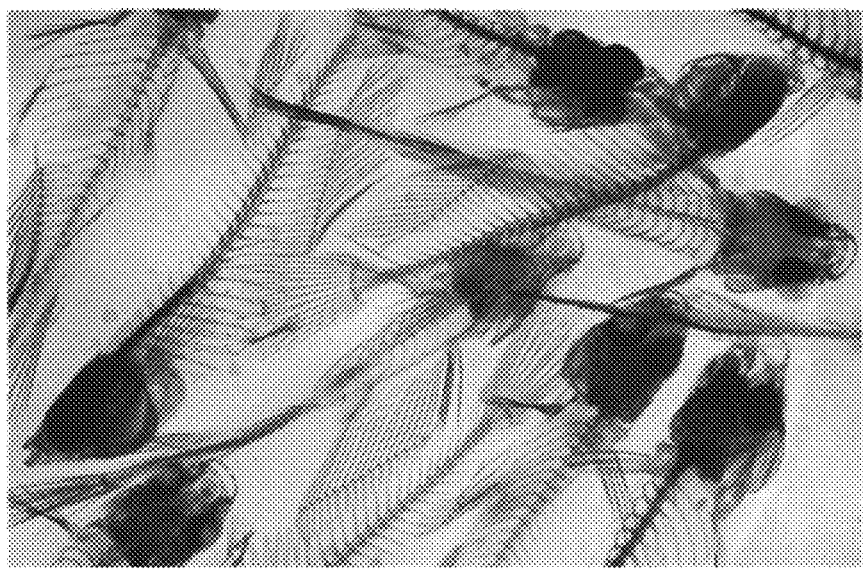
FIG. 12 shows the results of clearing tests on killifish.
Figure 13:
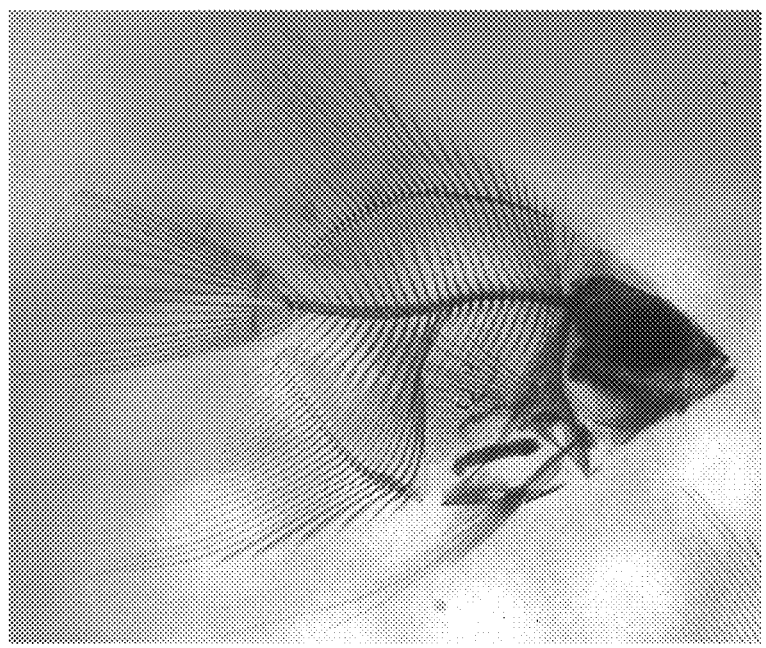
FIG. 13 shows the results of clearing tests on angelfish.

FIGS. 12 and 13 show the bone staining specimens (fixation: 2% paraformaldehyde phosphate buffer, 5% Triton X-100, 1% KOH) that were obtained from fish.

The killifish shown in FIG. 12 was completed in half a day. The transparency is greater than that obtained with a glycerol specimen.

The angelfish shown in FIG. 13 was completed in about 24 hours despite being a relatively large specimen.

Example 8

Method Employing Fixing Liquid not Containing Phosphate Buffer Liquid

Condition 1:
Fixation: Fixation (room temperature, overnight) with fixing liquid (mixed solution of 2% paraformaldehyde, 5% Triton X-100, 1% KOH).
Storage: Storage with storage liquid (25% Triton X-100, 1% Tween 20, 20% polyethylene glycol).
Condition 2 (Clearing processing of the present invention after usual fixation)
Fixation: Fixation (room temperature, overnight) with fixing liquid (2% paraformaldehyde).
Clearing-promotion: Clearing-promoting liquid (mixed solution of 5% Triton X-100 and 1% KOH) (room temperature, overnight).
Storage: Storage with storage liquid (25% Triton X-100, 1% Tween 20, 20% polyethylene glycol).
Condition 3 (clearing treatment of present invention after usual fixation)
Fixation: Fixation (room temperature, overnight) with fixing liquid (4% paraformaldehyde).
Clearing promotion: Fixation (room temperature, overnight) with clearing-promoting liquid (mixed solution of 5% Triton X-100, 1% KOH)
Storage: Storage with storage liquid (25% Triton X-100, 1% Tween 20, 20% polyethylene glycol).

Figure 14:
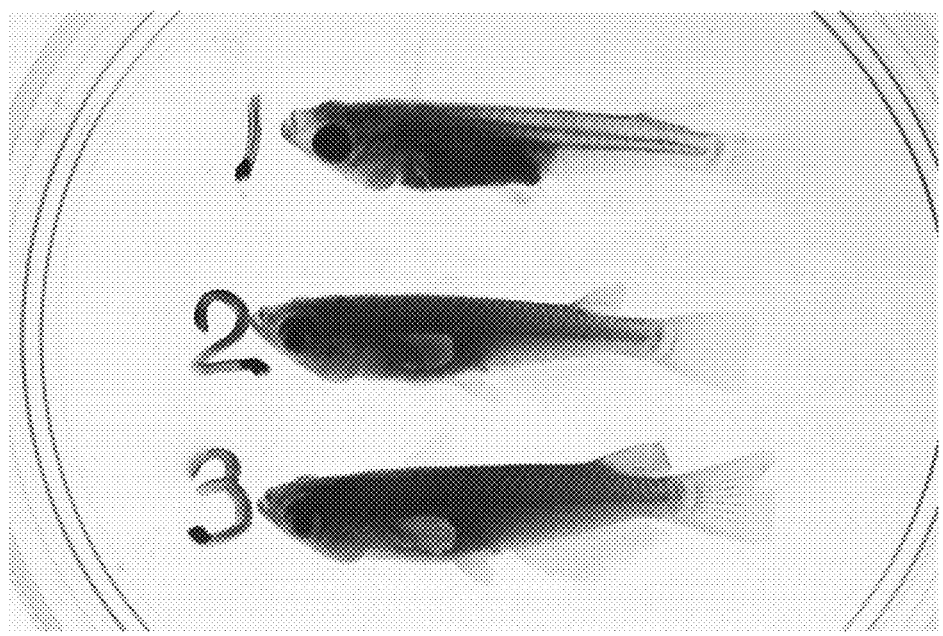
FIG. 14 shows the results of clearing tests when employing a fixing liquid not containing a phosphate buffer solution.
Figure 14:
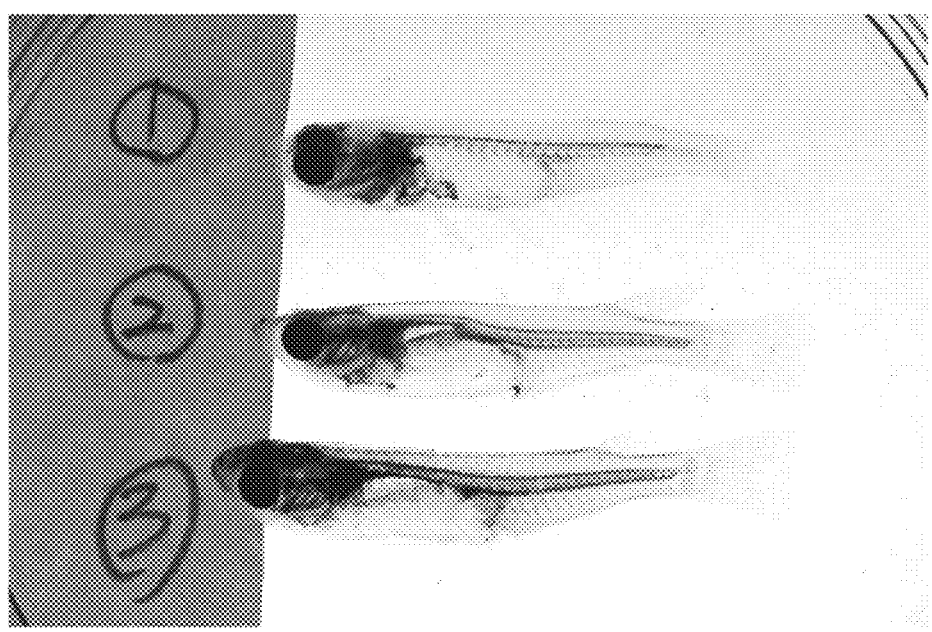

FIG. 14 shows photographs of a specimen after fixation and a specimen after clearing and storage. The numbers in the photographs are the condition numbers.

Example 9

Method of Bone Staining Employing Fixing Liquid not Containing Phosphate Buffer

Condition 1:
Fixation: Fixation (room temperature, overnight) with fixing liquid (mixed solution of 2% paraformaldehyde, 5% Triton X-100, 1% KOH).
Staining: Bone stained with Alizarin red S
Clearing promotion: Clearing-promoting liquid (20% Tween 20, 1% KOH) (42° C., overnight)
Additional clearing promotion: Additional clearing-promoting liquid (glycerol (100%))
Condition 2 (Clearing treatment after usual fixation)
Fixation: Fixation (room temperature, overnight) with fixing liquid (2% paraformaldehyde).
Clearing promotion: Clearing-promoting liquid (mixed solution of 5% Triton X-100 and 1% KOH) (room temperature, overnight)

Staining: Bone stained with Alizarin red S
Clearing promotion: Clearing-promoting liquid (20% Tween 20, 1% KOH) (42° C., overnight)
Additional clearing promotion: Additional clearing-promoting liquid (glycerol (100%))
Condition 3 (Clearing treatment following usual fixation)
Fixation: Fixation (room temperature, overnight) with fixing liquid (4% paraformaldehyde).
Clearing promotion: Clearing-promoting liquid (mixed solution of 5% Triton X-100, 1% KOH) (room temperature, overnight)
Staining: Bone stained with alizarin red S
Clearing promotion: Clearing-promoting liquid (20% Tween 20, 1% KOH) (42° C., overnight)
Additional clearing promotion: Additional clearing-promoting liquid (glycerol (100%))

Figure 15:
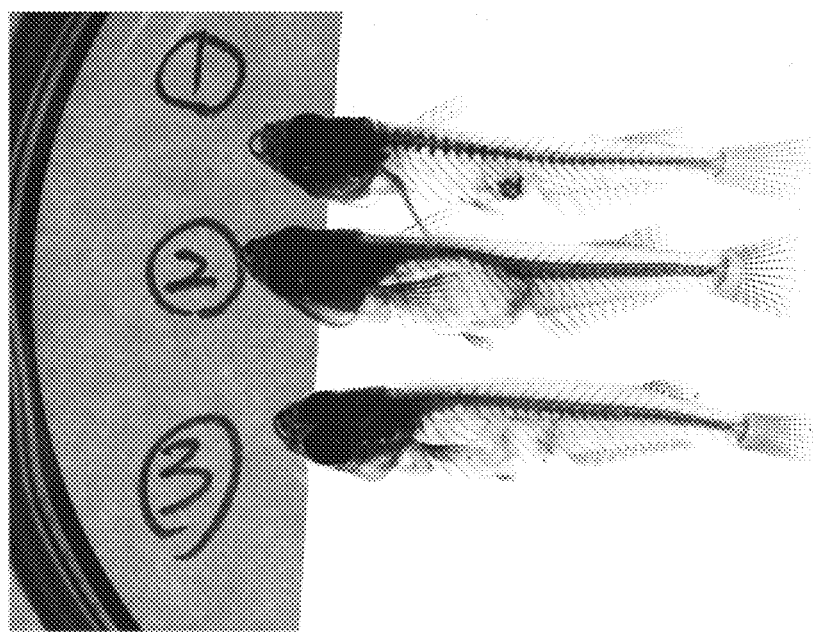
FIG. 15 shows the results of clearing tests when employing a fixing liquid not containing a phosphate buffer solution.

FIG. 15 shows photographs of a specimen following fixation and a specimen following clearing and storage. The numbers in the photographs are the condition numbers.

INDUSTRIAL APPLICABILITY

The present invention is useful in fields where the observing of biological specimens is essential.

The invention claimed is:

1. A kit for producing a cleared biological specimen, the kit comprising a fixing liquid, a clearing-promoting liquid, a storage liquid, and a bleaching agent; wherein:
the fixing liquid is (a) an aqueous solution comprising formaldehyde or paraformaldehyde, a nonionic surfactant, 0.1 to 2% w/v KOH or NaOH, and a buffer or (b) an aqueous solution comprising formaldehyde or paraformaldehyde, a nonionic surfactant, and 0.1 to 2% w/v KOH or NaOH, wherein the concentration of the nonionic surfactant in the fixing liquid is greater than or equal to 2 v/v %;
the clearing-promoting liquid is an aqueous solution comprising a nonionic surfactant and 0.1 to 2% w/v KOH or NaOH, wherein the concentration of the nonionic surfactant in the clearing-promoting liquid is greater than or equal to 1% v/v; and
the storage liquid is an aqueous solution comprising a nonionic surfactant and a polyhydric alcohol, wherein the concentration of the nonionic surfactant in the storage liquid is greater than or equal to 1% v/v, and
the bleaching agent is a mixed solution of hydrogen peroxide aqueous solution, acetone and ethylene glycol or a mixed solution of hydrogen peroxide aqueous solution, ethanol and ethylene glycol; and
wherein the fixing liquid, the clearing-promoting liquid, the storage liquid, and the bleaching agent of the kit are maintained separately in the kit.

2. The kit according to claim 1, wherein an additional clearing-promoting liquid comprised of a trivalent alcohol or an aqueous solution of a trivalent alcohol is further included.

3. The kit according to claim 2, wherein the fixing liquid is a mixed aqueous solution of 2 to 4% w/v formaldehyde or paraformaldehyde, 0.5 to 2% w/v KOH or NaOH, and 5 to 25% v/v octylphenolpoly(ethyleneglycolether) or polyoxyethylene sorbitan monolaurate nonionic surfactant.

4. The kit according to claim 2, wherein the concentration of the formaldehyde or paraformaldehyde in the fixing liquid is in a range of 2 to 4% w/v.

5. The kit according to claim 2, wherein the fixing liquid is a mixed aqueous solution comprising 2 to 4% w/v formaldehyde, a nonionic surfactant, an alkali, and phosphate buffer, or 2 to 4% w/v paraformaldehyde, a nonionic surfactant, an alkali, and phosphate buffer.

6. The kit according to claim 1, wherein the concentration of the nonionic surfactant in the fixing liquid is 2 to 40 v/v %.

7. The kit according to claim 1, wherein the nonionic surfactant is selected from the group consisting of ester nonionic surfactants, ether nonionic surfactants, and ester-ether nonionic surfactants.

8. The kit according to claim 7, wherein the ether nonionic surfactants is selected from the group consisting of octylphenolpoly(ethyleneglycolether), polyoxyethylene sorbitan monolaurate polyoxyethylene sorbitan monopalmitate polyoxyethylene sorbitan monostearate polyoxyethylene sorbitan tristearated polyoxyethylene sorbitan oleate.

9. The kit according to claim 1, wherein the fixing liquid is a mixed aqueous solution of 2 to 4% w/v formaldehyde phosphate buffer or paraformaldehyde phosphate buffer, 0.5 to 2% w/v KOH or NaOH, and 5% to 25% v/v octylphenolpoly(ethyleneglycolether) or polyoxyethylene sorbitan monolaurate nonionic surfactant.

10. The kit according to claim 1, wherein the biological specimen is a fish, reptile, amphibian, bird or mammal.

11. The kit according to claim 1, wherein the biological specimen is a biological tissue, wherein the biological tissue is an internal organ, a brain, or a bone.

12. The kit according to claim 1, wherein the concentration of the formaldehyde or paraformaldehyde in the fixing liquid is in a range of 2 to 4% w/v.

13. The kit according to claim 1, wherein the fixing liquid is a mixed aqueous solution comprising 2 to 4% w/v formaldehyde, a nonionic surfactant, an alkali, and phosphate buffer, or 2 to 4% w/v paraformaldehyde, a nonionic surfactant, an alkali, and phosphate buffer.

14. The kit according to claim 1, wherein the kit comprises at least one stain and the stain is selected from pigmented inks and fluorescent stains.

15. The kit according to claim 14, wherein the stain is Alizarin Red S.

16. The kit according to claim 1, wherein the bleaching agent is a mixed solution of 0.3% hydrogen peroxide aqueous solution, 70 to 50% acetone and 30 to 50% ethylene glycol or a mixed solution of 0.3% hydrogen peroxide aqueous solution, 50% ethanol, 50% ethylene glycol.

17. The kit according to claim 1, wherein the kit further comprises an instruction on microwave irradiation together with the fixing liquid.

* * * * *